Sept. 7, 1965     K. B. BREDTSCHNEIDER ETAL     3,204,930

RENEWABLE SEAT FOR GLOBE VALVES

Filed Feb. 25, 1963

Inventors.
Kurt B. Bredtschneider, &
Gordon H. Martin.
By Joseph O. Langer
Atty

United States Patent Office 3,204,930
Patented Sept. 7, 1965

3,204,930
RENEWABLE SEAT FOR GLOBE VALVES
Kurt B. Bredtschneider, Chicago, and Gordon H. Martin, Western Springs, Ill., assignors to Crane Co., Chicago, Ill., a corporation of Illinois
Filed Feb. 25, 1963, Ser. No. 260,701
4 Claims. (Cl. 251—361)

This invention relates broadly to valves, and, more specifically, it is concerned with a valve seat construction possessing the advantage of what is termed a quick-change trim to those skilled in the art.

One of the important objects of this invention is to provide a valve in which there is greater manufacturing economy, and greater flexibility in permitting desired replacements and repair.

A further object is to provide for a renewable valve seat construction in which a minimum amount of skill is required for the assembling and servicing of the valve of this invention.

Another important object is to provide for a valve in which a renewable seat is featured, wherein the seat comprises a relatively simple flat circular plate, the said plate being suitably apertured to provide for the usual seating of the closure member while also providing a portion of the flow path through the valve.

A further object is to provide for a valve construction in which the seat ring is retained in a body recess and clamped between the body or casing of the valve and a flange forming a portion of the valve bonnet.

A further object is to provide for a valve construction in which the body or casing permits of a simple face grinding operation with a relatively economical and effective method for providing the predeterminately communicating port openings through the valve.

A further object in connection with the valve construction of this invention is to provide for a renewable seat ring in which the gasket employed requires only a simple recessed face cooperating with the gasket on the under portion of the seat ring. This construction makes it unnecessary to remove the valve body itself from the pipe line for reconditioning because of the ease in which the valve seat ring can be removed, inspected, replaced, or repaired.

A further object is to provide for reversible seat ring whereby to allow for an additional seating face for the closure member when necessary.

A still further object of this invention is to provide for a valve casing having means therewith for carrying a spare seat ring.

The seat ring construction provided herein is relatively simple and easily available to thereby eliminate the need for a spare part.

A further object is to provide for a valve closure and a seating surface therefor, in which during the initial valve assembly the checking of closure member and seat bearing alignment is easily accomplished by merely clamping the seat ring in the recess between the body and bonnet and then preloading the closure member as desired. Conventional valves lack such ease of accessibility and there is an increased problem in checking the accuracy of the seat assembly.

A further object is to provide for a valve in which preferably the valve closure member therefor is guided in the bonnet of the valve, because of the location of the plane or level in which the seat is provided contributing to desirable compactness of construction.

A further object of the valve construction of this invention is to provide for a relatively simple renewable seat arrangement in which the seat is also easily rendered reversible.

Another object of this invention is to provide for a renewable seat construction in which the gaskets therefor are fully enclosed. This provision permits the use of available gaskets and/or metal O-rings to effect fluid sealing joints in a simple convenient manner.

A further object is to provide for a valve construction in which thermal shock conditions do not adversely affect the seat or gasket joints because of the manner in which the renewable seat ring is clamped between the valve body seat ring recess and the adjoining bonnet. Specifically, the abutting joint between the body and the bonnet lies in a single plane.

A further object is to provide for a valve construction having such flexibility that it becomes relatively simple, either in original manufacture or in the field to convert from a stop valve to a lift check valve by merely omitting the valve stem and bonnet and substituting a cap for the latter member.

A further object is to provide for a sufficiently flexible valve construction in which the prior need for relatively large stocks of seat rings is reduced to a bare minimum.

One of the more important objects of this invention therefore is to provide for a renewable seat construction in which the said seat is preferably mounted within a recess of the valve casing adjoining the inlet port of the valve and so retaining said seat as to permit of predetermined transverse adjustment with respect to the valve closure member in the final assembly.

Other objects and advantages will become more readily apparent upon proceeding with the specification read in light of the accompanying drawings, in which.

Similar reference numerals refer to similar parts throughout the several views.

Figure 1:
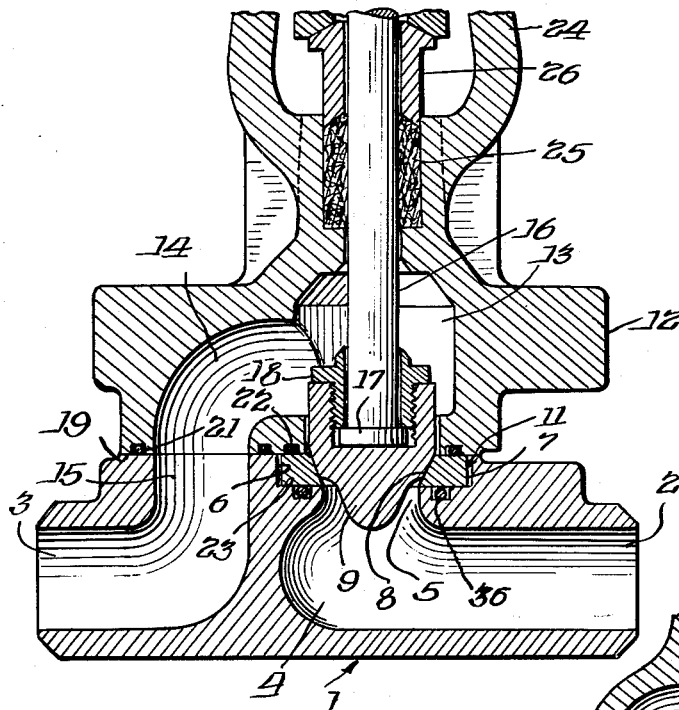
FIG. 1 is a fragmentary sectional assembly view of a valve embodying our invention.

Referring now to FIG. 1, a valve body or casing is shown designated 1 having the usual end connecting ports for a pipe line attachment as indicated at 2 and 3. At the central portion of the valve casing, a chamber is provided at 4 with a port 5 in communication with a seat receiving recess 6 containing the renewable valve seat ring 7, preferably of a suitably hardened material, the latter member being formed with an inclined annular surface 8 to receive the closure member 9 in fluid sealing relation.

It will be appreciated that the said annular surface 8 may also be provided on the opposite side of said seat ring 7 and thus by merely reversing or turning over the seat ring in its recess 6 a new seat surface for the closure member is thus provided.

The seat ring 7 of circular plate-like form is relatively smaller than the valve casing recess defined at 6 so as to provide slight transverse clearance therebetween as indicated at 11 for purposes hereinafter explained. In order to facilitate machining, the depth of the recess 6 and the thickness of the seat ring 7 are identical.

It should be understood that while only one seat ring 7 is shown in the drawings, actually a spare seat ring may be incorporated in the design by providing a recess (not shown), but similar to the recess 6 for carrying said second ring (not shown) around the upper limits of the casing port 15.

In cooperation with the valve casing 1, a bonnet 12 is mounted upon the casing and is provided with a communicating chamber 13 leading to the angularly extending port 14. The latter port is connected to the casing port 15 which in turn communicates with the valve port 3 for attachment to the pipe line as previously mentioned. The closure member 9 is reciprocally movable axially and this movement is accomplished by means of the usual valve stem 16 preferably threaded (not shown), the stem having the customary T-head connection 17 for attachment within the closure member 9 by means of a threaded disc-stem-bushing 18. Preferably, the connection between the stem and the closure member permits swivelability in moving over and around the T-head 17, but this is a matter of design. The valve bonnet 12 is provided on its inner end portion with a preferably plain surface 19 interrupted in its extant around the contact portion with the casing by means of an annularly extending O-ring 21 and 22 preferably of metal and of the self-energizing type extending around the respective ports 15 and 5. At its inner portion, the seat 7 makes a similar fluid sealing contact with the annular shoulder portion 23 cooperating with the recess 6.

The valve bonnet 12 consists of the usual yoke 24 and the stuffing box 25 with the gland member 26 for compressing the packing as shown. An important element of the construction, as previously described, resides in the manner in which a very simple, but effective, joint can be made between the bonnet and the seat ring 7 and between the seat ring and shoulder portion 23 of the recess 6.

The allowance for the annular clearance 11 previously referred to between the peripheral portion of the renewable seat 7 and the recess as defined at 6 provides for a desirable flexibility of movement or play whereby to adjust the seat ring axial position relative to the closure member central axis before the seat ring is clamped in final position by the body-bonnet bolts 10.

It will, of course, be appreciated that in view of the employment of a frusto-conical seating contact 8, it becomes relatively easy to align the actuating portion of the valve, such as the closure member and the stem, due to the initial slight transverse movability of the renewable valve seat ring 7.

It will be appreciated as previously explained above that while only a single seat surface at 8 is shown, the second seat surface can readily be provided in the event that the original valve becomes badly worn.

Figure 2:
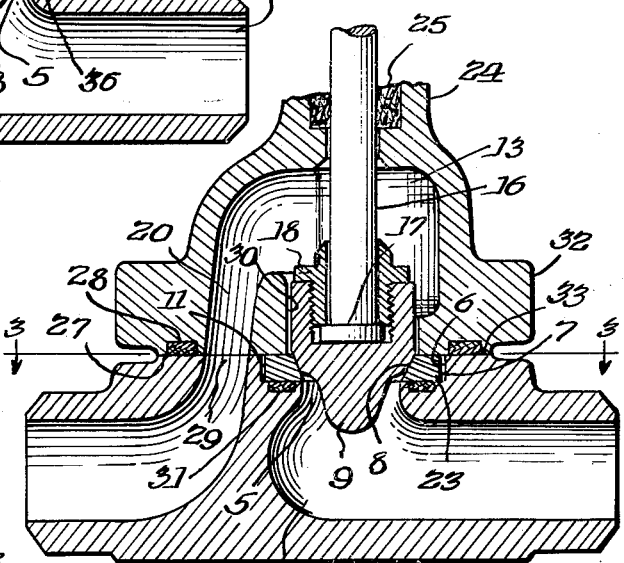
FIG. 2 is a modified form of a valve embodying our invention.
Figure 3:
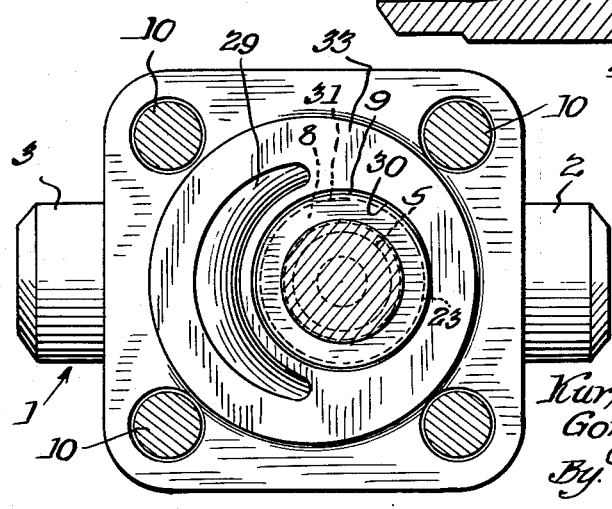
FIG. 3 is a transverse sectional view taken on the line 3—3 of FIG. 2.

Referring now to a further modified form shown in FIGS. 2 and 3, it will be noted that the bonnet contact surface at 27 is of circular configuration when viewed in plan and therefore the gasket 28 retained in the groove of the bonnet 32 as illustrated is likewise of circular form and surrounds both the port 5 and the arcuate port 29 (FIG. 3). Such construction thus eliminates the necessity for the separate set of gaskets as shown in FIG. 1. At its underportion and suitably sealed by means of the gasket 31, said bonnet presses the seat ring tightly against the casing body recessed surface as indicated at 23. A single fluid seal is thus provided between the bonnet and body by bearing against the surface 33 and surrounds both port openings 5 and 29 of the valve casing as previously stated.

While the recess 6 has been shown and described as being in the casing 1, it will of course be understood that the underside of the bonnet 12 may be provided with a recess to receive the seat ring. Likewise, the recesses for the sealing means 22 and 36 may be provided in the seat ring itself, the benefit gained being that the plain surface defining the upper limits of the casing can then be more easily refaced while in the pipe line.

In summary, a relatively economical and easily renewable valve seat construction has been provided in this invention, while making it unnecessary to remove the valve casing from the pipe line for repairs.

The several embodiments shown and/or described are for purposes of illustration only and therefore the scope of the invention should be measured by the appended claims.

We claim:

1. In a renewable valve seat construction, the combination of a ported valve body having side disposed passageways, a valve bonnet having a passageway connecting said disposed body passageways in said ported body, a renewable valve seat ring retained in fluid sealing relation between said body and bonnet, the said body and bonnet having therebetween a recessed portion adjoining at least one of the said ported portions of the said valve body, said valve seat ring being received between said body and bonnet in the recessed portion of said body and having annular surfaces formed thereon to cooperate with a valve closure member, the said valve seat ring being positioned adjacent the inner end of one of the said passageways in said valve body and being relatively loosely received in said body recessed portion whereby to permit predetermined transverse movement of said valve seat ring and axial alignment adjustability of the seat relative to the closure member during valve assembly.

2. The subject matter of claim 1, the said retained seat ring having annular fluid sealing means in planes above and below said seat ring.

3. The subject matter of claim 1, a single annular gasket clamped in a recess between said body and said bonnet and surrounding the body side ported portions communicating with said bonnet.

4. The subject matter of claim 3, fluid sealing means for said renewable seat ring comprising a gasket retained in a recess between said body and bonnet in a plane below said seat ring.

References Cited by the Examiner

UNITED STATES PATENTS

| | | | |
|---|---|---|---|
| 1,225,002 | 5/17 | Beam | 137—329.03 |
| 1,925,392 | 9/33 | La Bour | 251—84 X |
| 1,947,257 | 2/34 | Fritz et al. | 251—361 XR |
| 2,059,370 | 11/36 | Lane | 137—329.03 |
| 2,101,970 | 12/37 | Wissler | 251—359 XR |
| 2,301,276 | 11/42 | Gussick | 251—361 XR |
| 2,454,160 | 11/48 | Greene | 137—375 X |
| 2,622,886 | 12/52 | McKee | 251—359 XR |
| 2,660,398 | 11/53 | Bashark | 251—361 |
| 2,665,675 | 1/54 | Sheppard | 251—359 XR |
| 2,767,730 | 10/56 | Laird | 137—329.02 |
| 2,893,430 | 7/59 | Holl | 251—361 XR |
| 2,988,108 | 6/61 | Malmquist et al. | 251—316 XR |

LAVERNE D. GEIGER, *Primary Examiner.*